US012721781B1

(12) United States Patent
Kou

(10) Patent No.: US 12,721,781 B1
(45) Date of Patent: Sep. 1, 2026

(54) WEARABLE ADULT MASSAGE DEVICE AND MASSAGE METHOD THEREOF

(71) Applicant: Dongguan Aiershi Technology Co., Ltd., Dongguan City (CN)

(72) Inventor: Shijun Kou, Chongqing (CN)

(73) Assignee: Dongguan Aiershi Technology Co., Ltd., Dongguan City (CN)

( * ) Notice: Subject to any disclaimer, the term of this patent is extended or adjusted under 35 U.S.C. 154(b) by 0 days.

(21) Appl. No.: 19/223,256

(22) Filed: May 30, 2025

(51) Int. Cl.
*A61H 23/02* (2006.01)

(52) U.S. Cl.
CPC ...... *A61H 23/02* (2013.01); *A61H 2201/0111* (2013.01); *A61H 2201/1638* (2013.01); *A61H 2201/1685* (2013.01); *A61H 2201/1695* (2013.01)

(58) Field of Classification Search
CPC ........ A61H 2205/065; A61H 2205/087; A61H 19/30; A61H 39/04; A61H 2201/165; A61B 5/681
See application file for complete search history.

(56) References Cited

U.S. PATENT DOCUMENTS 5,575,761 A * 11/1996 Hajianpour ........ A61H 23/0263 601/48
2003/0181835 A1* 9/2003 Klein ..................... A61H 19/30 601/72
2006/0094992 A1* 5/2006 Imboden ............ A61H 23/0263 601/72
2008/0027363 A1* 1/2008 Brueckmann ...... A61H 23/0263 601/46
2009/0177129 A1* 7/2009 Chan .................. A61H 23/0254 601/134
2013/0289346 A1* 10/2013 Standfest ............... A61H 19/00 600/38
2016/0037875 A1* 2/2016 Rohrbach ................ A44C 5/14 224/267
2018/0116904 A1* 5/2018 Lieberman ............. A61H 19/34
2023/0001131 A1* 1/2023 English ................. A61M 21/02

* cited by examiner

*Primary Examiner* — Joseph D. Boecker
*Assistant Examiner* — Brian T Khong
(74) *Attorney, Agent, or Firm* — Nicholas Makridakis

(57) ABSTRACT

A wearable adult massage device and massage method thereof is provided, including an adult massage body applicable to wear on users' limbs, and the adult massage body consists of a wearable component and massage components. The massage components are detachably assembled with the wearable component, and different massage components are selected to be assembled with the wearable component together to massage the users in different scenarios. The massage mechanism is provided with multiple replaceable massage heads that can generate different massage sensations, fully meeting the diverse massage needs of users. The users can freely combine the wearable component and the massage components based on their current physical condition, fatigue level, and personal preferences, truly achieving efficient massage anytime, anywhere, and at will.

4 Claims, 9 Drawing Sheets

WEARABLE ADULT MASSAGE DEVICE AND MASSAGE METHOD THEREOF

TECHNICAL FIELD

The present disclosure relates to the technical field of adult products, and specifically to a wearable adult massage device and massage method thereof.

BACKGROUND

In the current fast-paced lifestyle, adult women often bear various pressures such as work and family, and are prone to feel exhausted both physically and mentally. Therefore, the demand for massage relaxation is becoming increasingly strong. However, most of the existing adult massage products on the market adopt a fixed design, rely on specific sockets for power supply, and also have a large volume. When in use, the adult massage products may only be limited to a fixed space, such as at home or in a massage parlor. For women who want to enjoy massage relaxation, a lot of preparation work needs to be done in advance or other personnel assistance is needed, which are extremely inconvenient and cannot meet the demands of people to relax anytime and anywhere in modern fast-paced life.

SUMMARY

The present disclosure aims to provide a wearable adult massage device and massage method thereof to address the problems raised in the background.

To achieve the above objectives, the present disclosure adopts the following technical solutions.

In a first aspect, in some embodiments of the present disclosure, a wearable adult massage device is provided, including an adult massage body applicable to wear on users' limbs, and the adult massage body consists of a wearable component and massage components. The massage components are detachably assembled with the wearable component, and different massage components are selected to be assembled with the wearable component together to massage the users in different scenarios.

In some embodiments of the present disclosure, the wearable component includes a first strap and a second strap, the first strap and the second strap each is provided with a connecting portion on one end thereon, and the first strap and the second strap are fixedly connected together at another end thereon by a limiting mechanism.

In some embodiments of the present disclosure, the connecting portion is a plug-in connecting portion, the plug-in connecting portion includes a spring pin, the spring pin is inserted into an insertion hole provided at the one end of the first strap or the second strap, and both ends of the spring pin are placed outside the insertion hole.

In some embodiments of the present disclosure, the connecting portion is a magnetic connecting portion, the magnetic connecting portion includes a magnetic pin, and the magnetic pin is inserted into an insertion hole provided at the one end of the first strap or the second strap.

In some embodiments of the present disclosure, each of the massage components includes an outer case, an outer side of the outer case is provided with an installation portion applicable to the connecting portion, and the outer case is internally provided with a detachable massage mechanism for providing different massage sensations.

In some embodiments of the present disclosure, the limiting mechanism includes two strap passages provided on a surface of the first strap, a limit fastener is provided between the two strap passages to fixedly connect to a bottom surface of the first strap, a surface of the second strap is provided with a plurality of limit strap holes, and the limit fastener is inserted into corresponding limit strap hole for locking after one end of the second strap passes through the two strap passages.

In some embodiments of the present disclosure, the installation portion is configured with at least two types, one installation portion is configured as a plug-in fixing lug applicable to the plug-in connecting portion, the plug-in fixing lug is provided with two groups, each group of the plug-in fixing lug is fixedly provided on the outer side of the outer case, and an inner side of the plug-in fixing lug is provided with a pin hole applicable to a size of ends of the spring pin.

In some embodiments of the present disclosure, another installation portion is configured as a magnetic fixing lug applicable to the magnetic connecting portion, the magnetic fixing lug is provided with two groups, each group of the magnetic fixing lug is fixedly provided on the outer side of the outer case, and an inner side of the magnetic fixing lug is provided with a magnetic base applicable to a size of ends of the magnetic pin.

In some embodiments of the present disclosure, the massage mechanism includes a waterproof case, the waterproof case is interlacedly connected to the outer case, the waterproof case is internally provided with a vibration member and a control member, a waterproof cover is fixedly installed on a top of the waterproof case, and the top of the waterproof cover is provided with multiple massage heads for providing different massage sensations.

In some embodiments of the present disclosure, an outer side of the waterproof case is fixedly connected with multiple bar-type protrusions, in case the waterproof case is interlacedly assembled with the outer case, the bar-type protrusions are tightly in contact with an inner wall of the outer case, the waterproof case and the outer case each is provided with a button hole at one side thereon, a bottom of the waterproof case is provided with a magnetic charging base.

In some embodiments of the present disclosure, the vibration member includes a driving motor placed within the waterproof case, the driving motor is fixedly installed with a motor limit seat provided within the waterproof case and the waterproof cover, and an output end of the driving motor is connected to a connecting arm enables its reciprocating swing.

In some embodiments of the present disclosure, the control member includes a PCB control board placed within the waterproof case, a surface of the PCB control board is integrated with a multifunctional control button, and one end of the multifunctional control button is placed within the button hole, and the PCB control board is fixedly installed with a circuit board limit seat disposed within the waterproof case and the waterproof cover.

In some embodiments of the present disclosure, each of the massage heads includes a vibrating plate, a socket adapted to a size of one end of the connecting arm is provided at a bottom of the vibrating plate, the socket is sleeved with the one end of the connecting arm, a top of the vibrating plate is fixedly connected with a spherical seat of the strap passages, and a top of the spherical seat of the strap passages is detachably provided with a silicone massage body.

In some embodiments of the present disclosure, the silicone massage body is configured with at least two types, a top of the silicone massage body is provided with massage protrusions or a massage groove, a bottom of the silicone massage body is fixedly connected with a plug pin, and the plug pin is inserted into a hole in the spherical seat of the strap passages.

In a second aspect, in some embodiments of the present disclosure, a massage method is provided, which is performed by using the wearable adult massage device described above, and the method includes the following steps.

S1, wearing the wearable adult massage device through the wearable component.

S2, selecting different massage components and the wearable component to be assembled together respectively to achieve massage in different scenarios.

Compared with the existing technologies, the wearable adult massage device and massage method thereof of the present disclosure has at least the following beneficial effects.

The wearable adult massage device of the present disclosure, the massage components and the wearable component adopt a detachable assembly design, and multiple types of installation portions can accurately adapt to the installation of different straps, greatly enhancing the universality and compatibility of this product. At the same time, the massage mechanism is provided with multiple replaceable massage heads that can generate different massage sensations, fully meeting the diverse massage needs of users. The users can freely combine the wearable component and the massage components based on their current physical condition, fatigue level, and personal preferences, truly achieving efficient massage anytime, anywhere, and at will. Moreover, its compact size not only significantly improves the convenience of adult massage products, but also expands the applicability of massage, creating a higher quality and personalized massage relaxation experience for adult women.

BRIEF DESCRIPTION OF THE DRAWINGS

The accompanying drawings, which constitute a part of the present specification, are used to provide further understanding of the present disclosure. The illustrative embodiments and their descriptions are used to explain the present disclosure and do not constitute undue limitation of the present disclosure.

Figure 1:
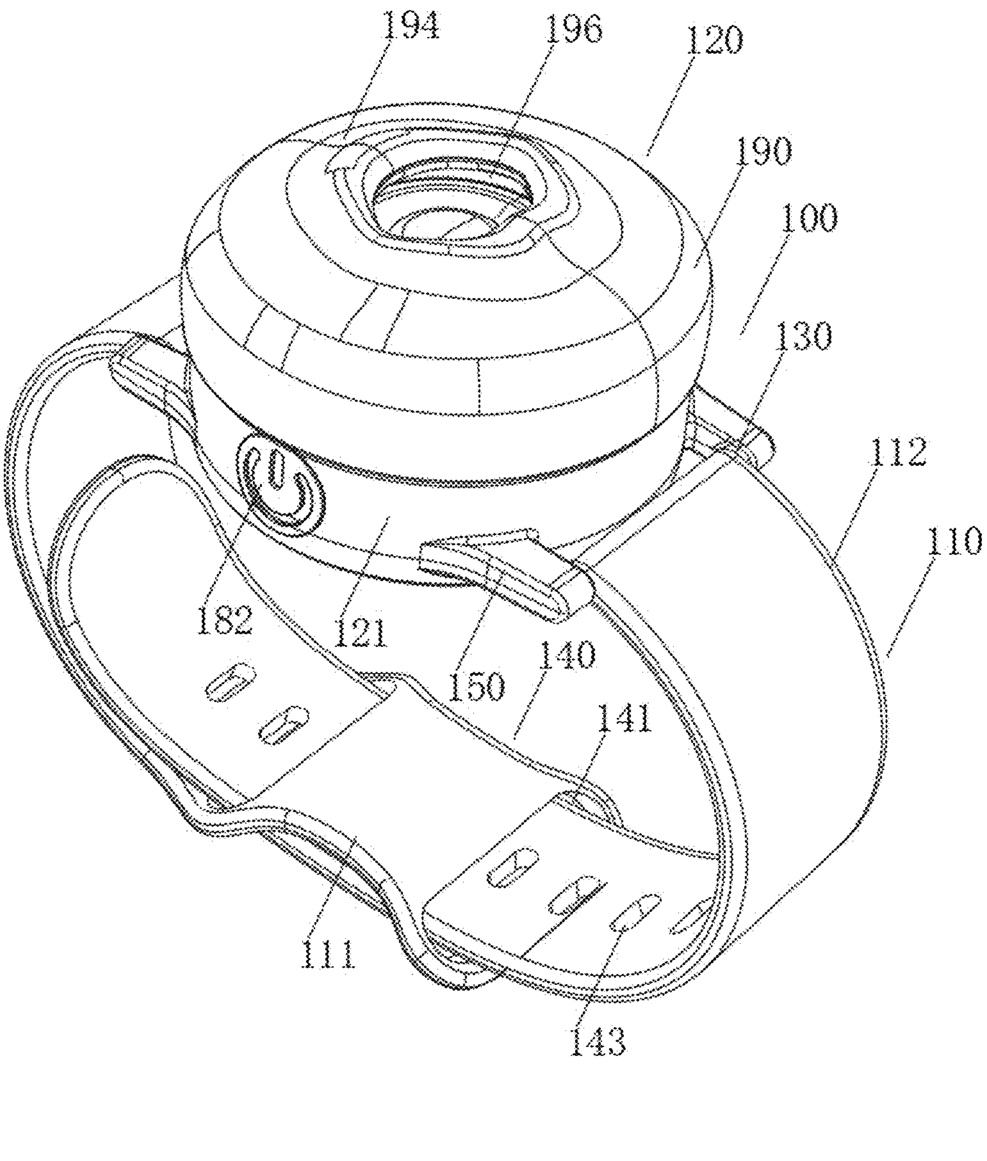
FIG. 1 shows a structural schematic diagram of a wearable adult massage device in accordance with some embodiments of the present disclosure.
Figure 2:
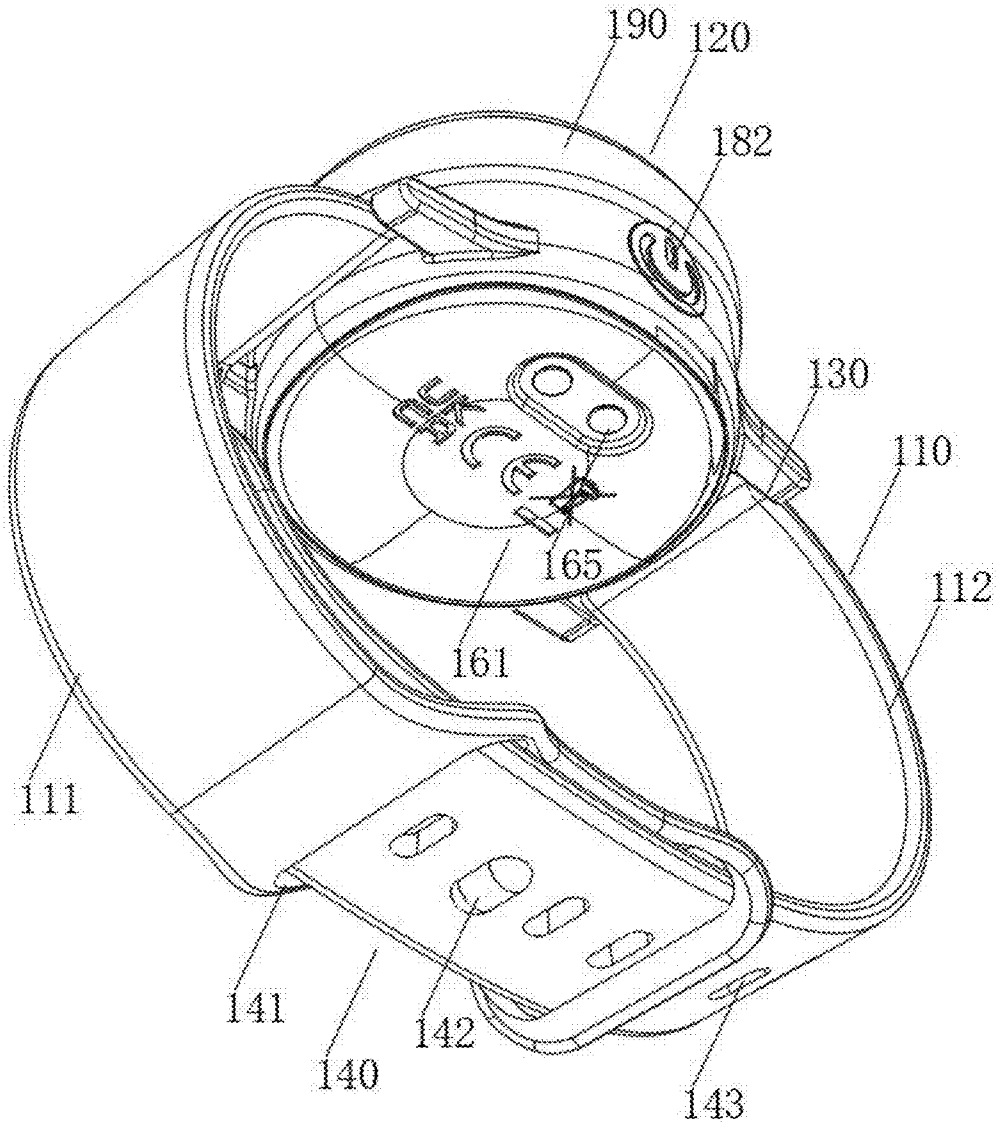
FIG. 2 shows another structural schematic diagram of the wearable adult massage device in accordance with some embodiments of the present disclosure.

In the drawings, reference numerals are as following. 100. Adult massage body, 110. Wearable component, 111. First strap, 112. Second strap, 120. Massage component, 121. Outer case, 130. Connecting portion, 131. Spring pin, 132. Insertion hole, 133. Magnetic pin, 140. Limiting mechanism, 141. Strap passage, 142. Limit fastener, 143. Limit strap hole, 150. Installation portion, 151. Plug-in fixing lug, 152. Pin hole, 153. Magnetic fixing lug, 154. Magnetic base, 160. Massage mechanism, 161. Waterproof case, 162. Waterproof cover, 163. Bar-type protrusion, 164. Button hole, 165. Magnetic charging base, 166. Motor limit seat, 167. Circuit board limit seat, 170. Vibration member, 171. Driving motor, 172. Connecting arm. 180. Control member, 181. PCB control board, 182. Multifunctional control button, 190. Massage head, 191. Vibrating plate, 192. Socket, 193. Holed spherical seat, 194. Massage body, 195. Massage protrusion, 196. Massage groove, 197. Plug pin.

DETAILED DESCRIPTION OF THE EMBODIMENTS

To clarify the objectives, technical solutions, and advantages of the embodiments of the present disclosure, the following will provide a clear and complete description of the technical solutions in the embodiments of the present disclosure in conjunction with the accompanying drawings. Obviously, the described embodiments are a part of the embodiments of the present disclosure, not all of them. Based on the embodiments of the present disclosure, all other embodiments obtained by one of ordinary skill in the art without creative labor shall fall within the scope of protection of the present invention.

Therefore, the detailed description of the embodiments of the present disclosure provided in conjunction with the accompanying drawings is not intended to limit the scope of protection of the present invention, but only to represent illustrated embodiments of the present disclosure. Based on the embodiments of the present disclosure, all other embodiments obtained by one of ordinary skill in the art without creative labor shall fall within the scope of protection of the present invention.

It should be noted that similar reference numerals and letters represent similar terms in the following figures. Therefore, once a term is defined in one figure, it does not need to be further defined and explained in subsequent figures.

In the description of the present disclosure, it should be noted that the terms “center”, “longitudinal”, “transverse”, “length”, “width”, “thickness”, “up”, “down”, “front”, “back”, “left”, “right”, “vertical”, “horizontal”, “top”, “bottom”, “inside”, “outside”, “clockwise”, “counterclockwise” and other directional or positional relationships indicated are based on the directional or positional relationships shown in the accompanying drawings, only for the convenience of describing the present disclosure and simplifying the description, and do not indicate or imply that the device or components referred to must have specific orientations, be constructed and operated in specific orientation. Therefore, it cannot be understood as a limitation on the present disclosure.

Furthermore, the terms “first”, “second” are only used for descriptive purposes and cannot be understood as indicating or implying relative importance or implying the number of technical features indicated. Thus, the features limited to “first” and “second” may explicitly or implicitly include one or more of these features. In the description of the present disclosure, “multiple” means two or more, unless otherwise specifically limited.

In the present disclosure, unless otherwise specified and limited, the terms “installation”, “connect”, “connection”, “fixation”, etc. should be broadly understood, for example, they may be fixed connections, detachable connections, or integrated. Alternatively, it may be directly connected or indirectly connected through an intermediate medium, and it may be a connection within two components or an interaction relationship between two components. For one of ordinary skill in the art, the specific meanings of the above terms in the present disclosure may be understood according to the specific situation.

In the present disclosure, unless otherwise specified and limited, the first feature above or below the second feature may include direct contact between the first and second features, or may include contact between the first and second features through another feature between instead of direct contact. Moreover, the first feature “on”, “above” and “onto” the second feature includes the first feature being directly above and diagonally above the second feature, or simply indicating that the first feature is horizontally higher than the second feature. The first feature “under”, “below”, “lower” the second feature includes the first feature directly below and diagonally below the second feature, or simply indicating that the first feature has a lower horizontal than the second feature.

Embodiments

Referring to FIG. 1 to FIG. 9, in some embodiments of the present disclosure, a wearable adult massage device is provided, including an adult massage body 100 applicable to wear on users’ limbs, and the adult massage body 100 consists of a wearable component 110 and massage components 120. The massage components 120 are detachably installed with the wearable component 110, and different massage components 120 are selected to be assembled with the wearable component 110 together to massage the users in different scenarios.

Figure 9:
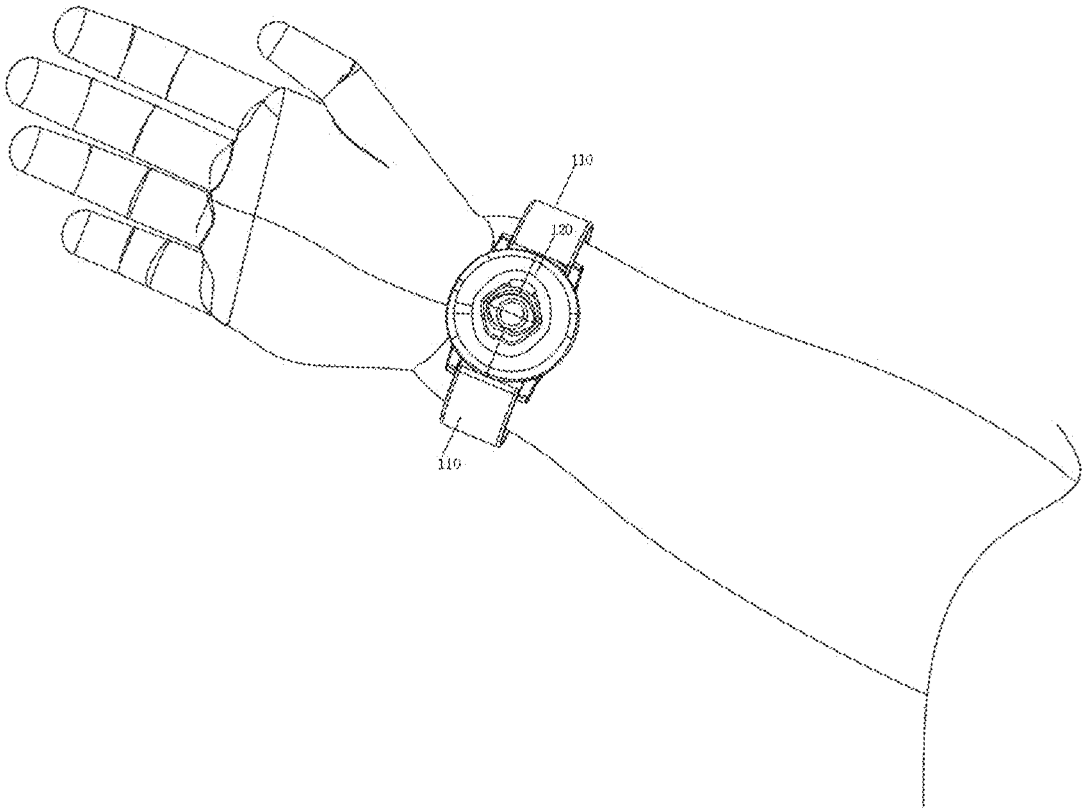
FIG. 9 shows a schematic diagram of a usage state of the wearable adult massage device in accordance with some embodiments of the present disclosure.

Specifically, when women pay attention to the need for soothing and relaxing their private parts, they can easily start the massage process. Firstly, gently wear the wearable component 110 on their wrist (as shown in FIG. 9). The massage components 120 and the wearable component 110 are detachable and can be selected according to the massage needs, providing women with a high degree of flexibility in choosing the appropriate massage component 120. Especially during the menstrual period of women, there may be varying degrees of heaviness and swelling in their private areas. At this time, the massage components 120, which focuses on gentle vibration and stress relief, may be installed on the wearable component 110, allowing for precise care and massage of private areas to meet diverse private care needs.

Moreover, due to the fact that the adult massage body 100 is only composed of the wearable component 110 and the massage components 120, so that the size of the adult massage body 100 is relatively small. During massage, there is no need for additional complex power supply, and it can be easily massaged without the assistance of others. This not only significantly improves the convenience of the adult massage device of the present disclosure, but also expands their practicality.

In some embodiments of the present disclosure, the wearable component 110 includes a first strap 111 and a second strap 112, the first strap 111 and the second strap 112 each is provided with a connecting portion 130 on one end thereon, and the first strap 111 and the second strap 112 are fixedly connected together at another end thereon by a limiting mechanism 140.

Specifically, when wearing the adult massage device of the present disclosure, first wrap the first strap 11 around one side of the wrist to fit the natural curve of the wrist, and then wrap the second strap 112 around the other side of the wrist. The connecting portion 130 on one end of the first strap 111 and the second strap 112 can be flexibly installed with the appropriate massage component 120 according to massage needs, while the other end of the first strap 111 and the second strap 112 are fixedly connected with the limiting mechanism 140. The users can flexibly adjust the length of the second strap 112 passing through the two strap passages 141 disposed on the first strap 111 according to the thickness of their wrist, and then accurately insert the limit fastener 142 into the appropriate position of the limit strap holes 142 disposed on the second strap 112. The wearable component 110 can be stably and comfortably worn on the wrist, providing a solid foundation for subsequent installation of the massage component 120 and efficient massage, ensuring that the wearable component 110 will not slide or fall off during the massage process, and also ensuring the continuity and effectiveness of the massage experience.

Figure 3:
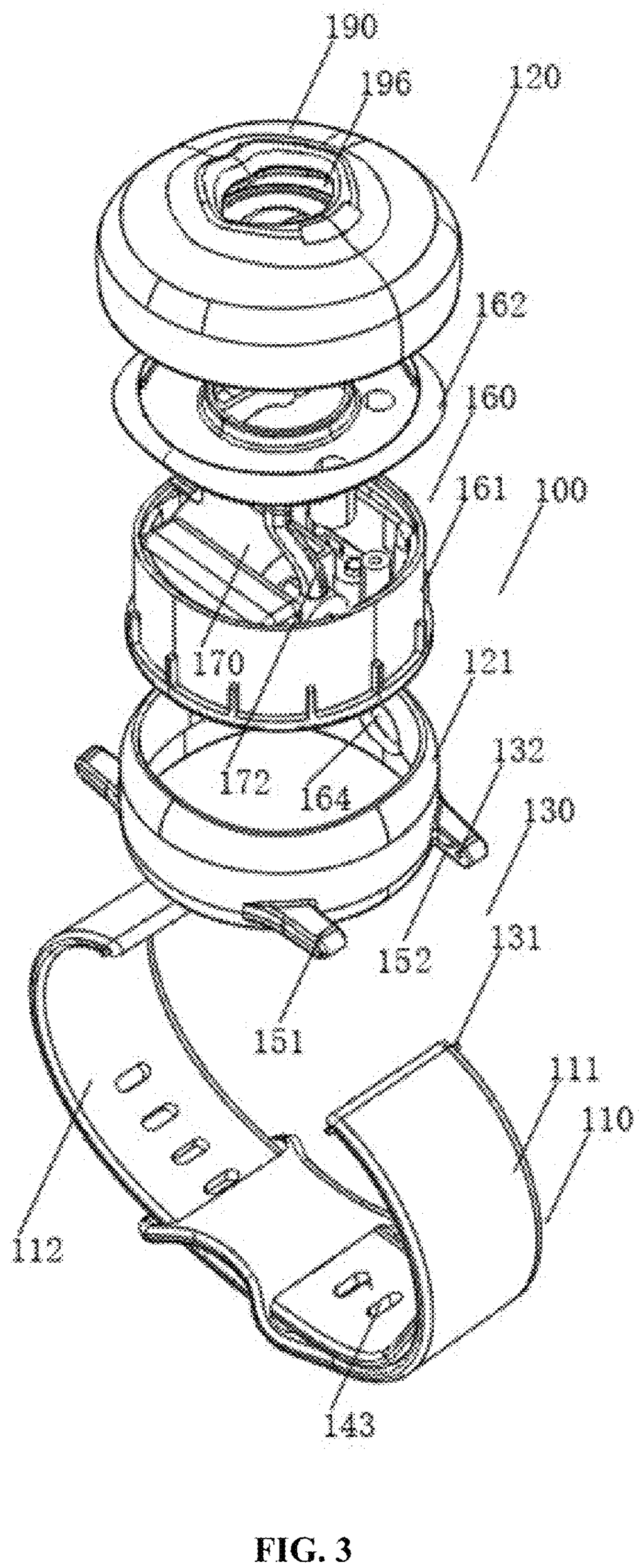
FIG. 3 shows an exploded view of the wearable adult massage device in accordance with some embodiments of the present disclosure.

In some embodiments of the present disclosure, referring to FIG. 3, the connecting portion 130 is configured as a plug-in connecting portion 130, the plug-in connecting portion 130 includes a spring pin 131, the spring pin 131 is inserted into an insertion hole 132 provided at the one end of the first strap 111 or the second strap 112, and both ends of the spring pin 131 are placed outside the insertion hole 132. The corresponding compatible installation portion 150 is configured as a plug-in fixing lug 151 applicable to the plug-in connecting portion 130, the plug-in fixing lug 151 is provided with two groups, each group of the plug-in fixing lug 151 is fixedly provided on the outer side of the outer case 121, and an inner side of the plug-in fixing lug 151 is provided with a pin hole 152 applicable to a size of ends of the spring pin 131.

Specifically, when the connecting portion 130 is configured as the plug-in connecting portion 130, the installation portion 150 of the massage components 120 is selected as the plug-in fixing lug 151 of the plug-in connecting portion 130. By precisely inserting the end of the spring pin 131 into the pin hole 152 disposed on the inner side of the plug-in fixing lug 151, the connection between the wearable component 110 and the massage components 120 can be quickly and stably achieved, allowing women to easily start massage care of private parts and relieve discomfort in postpartum private parts.

Figure 5:
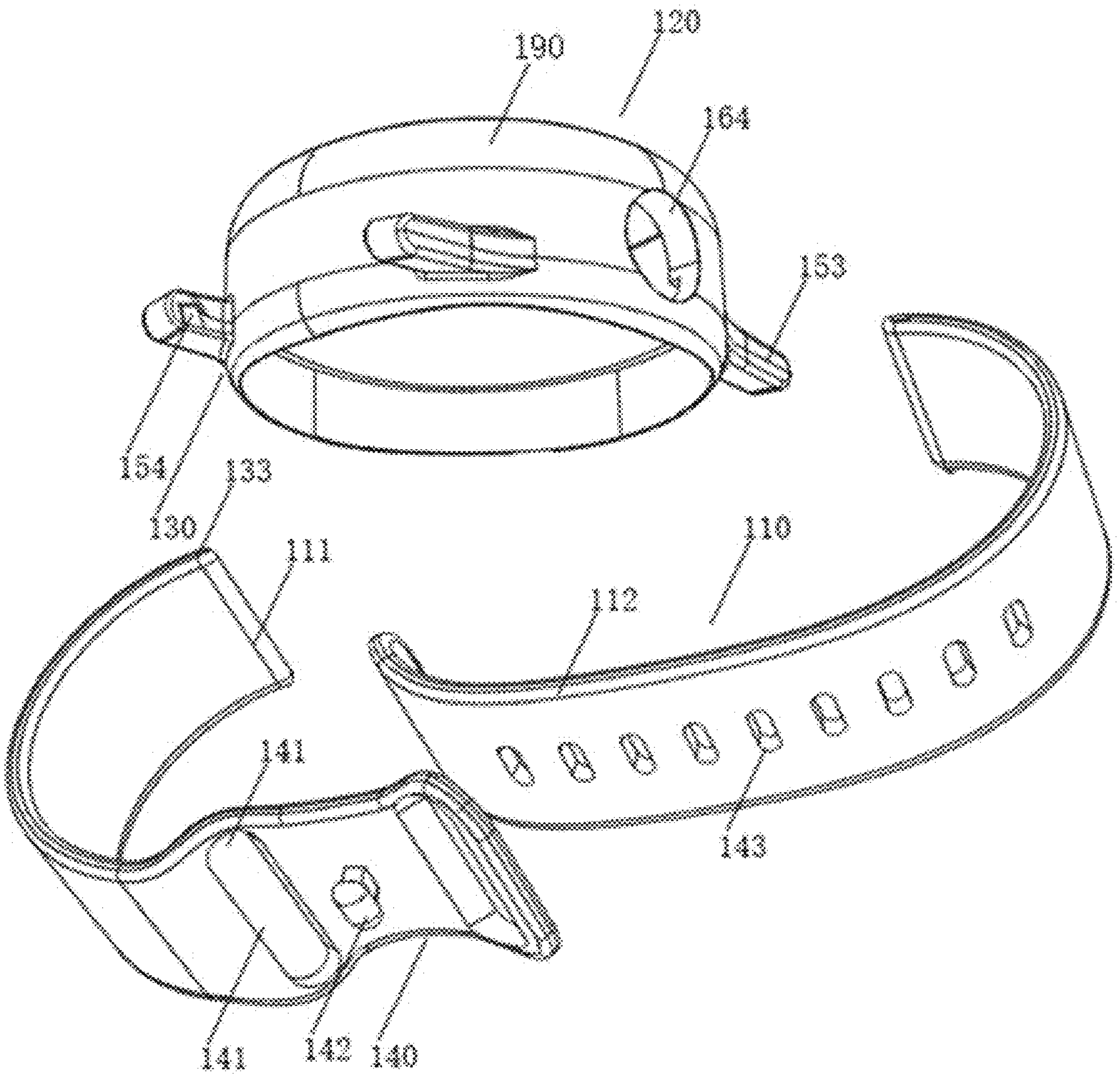
FIG. 5 shows a structural schematic diagram of a connecting portion of the wearable adult massage device in accordance with some embodiments of the present disclosure.
Figure 6:
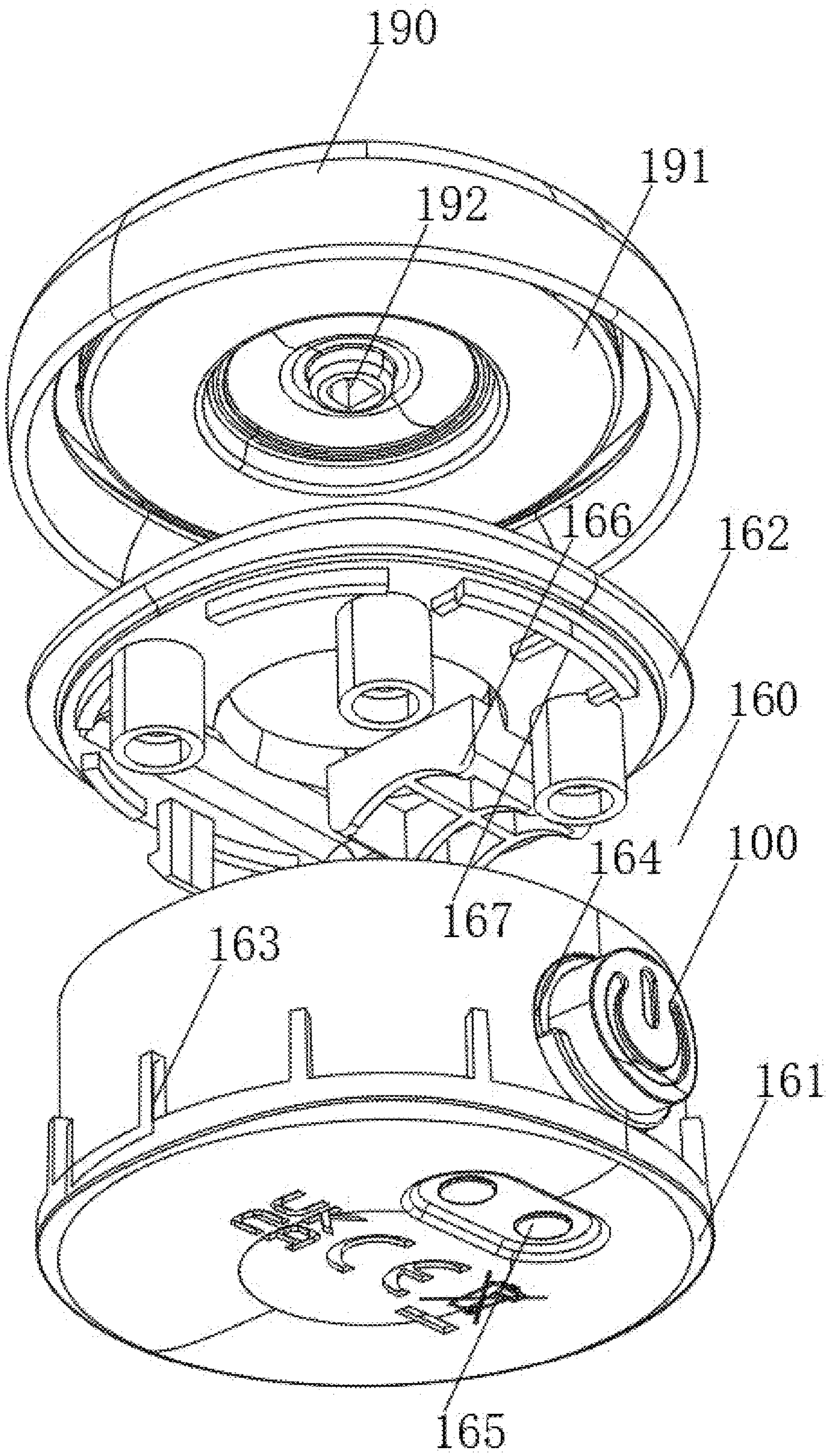
FIG. 6 shows a structural schematic diagram of a massage mechanism in accordance with some embodiments of the present disclosure.
Figure 7:
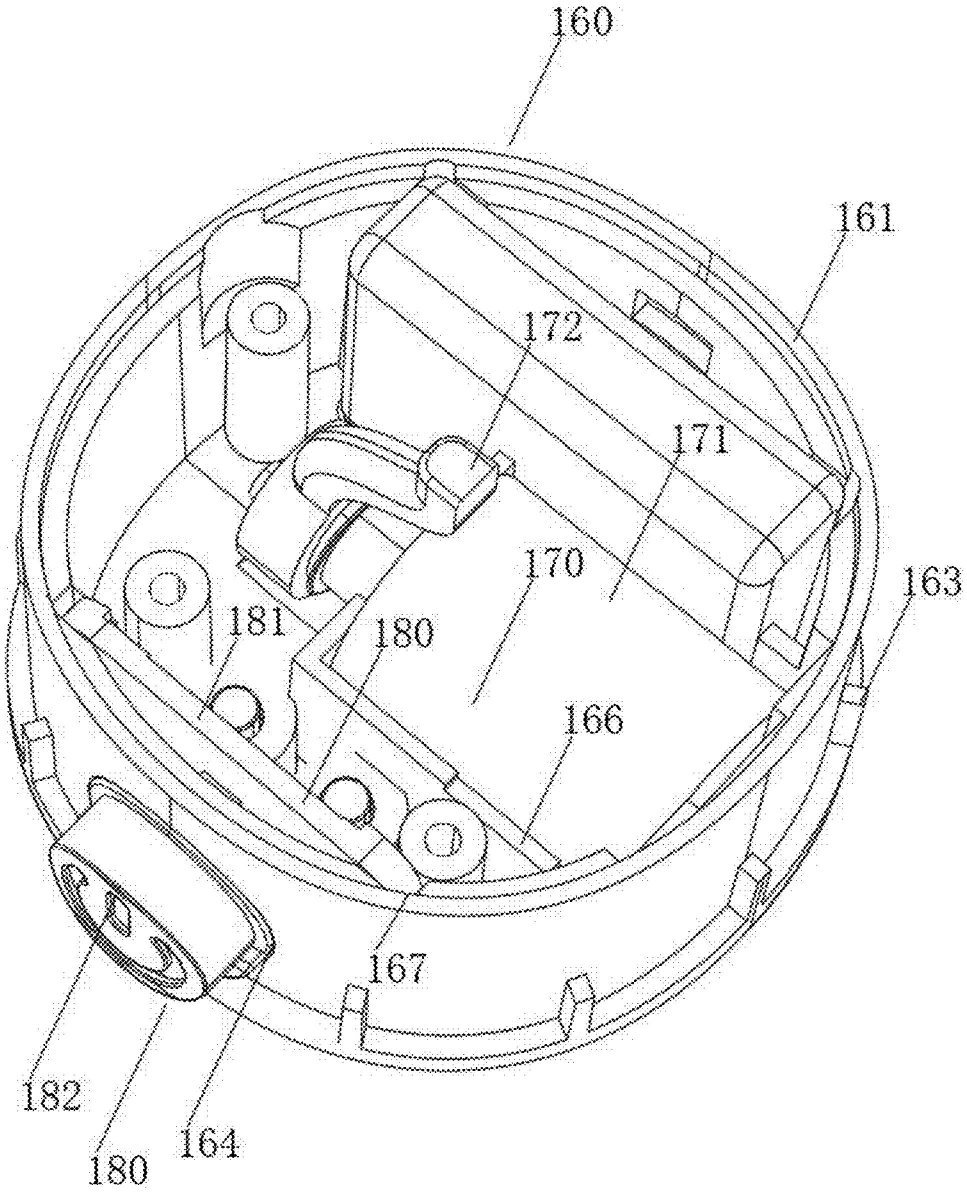
FIG. 7 shows a structural schematic diagram of a vibration member in accordance with some embodiments of the present disclosure.
Figure 8:
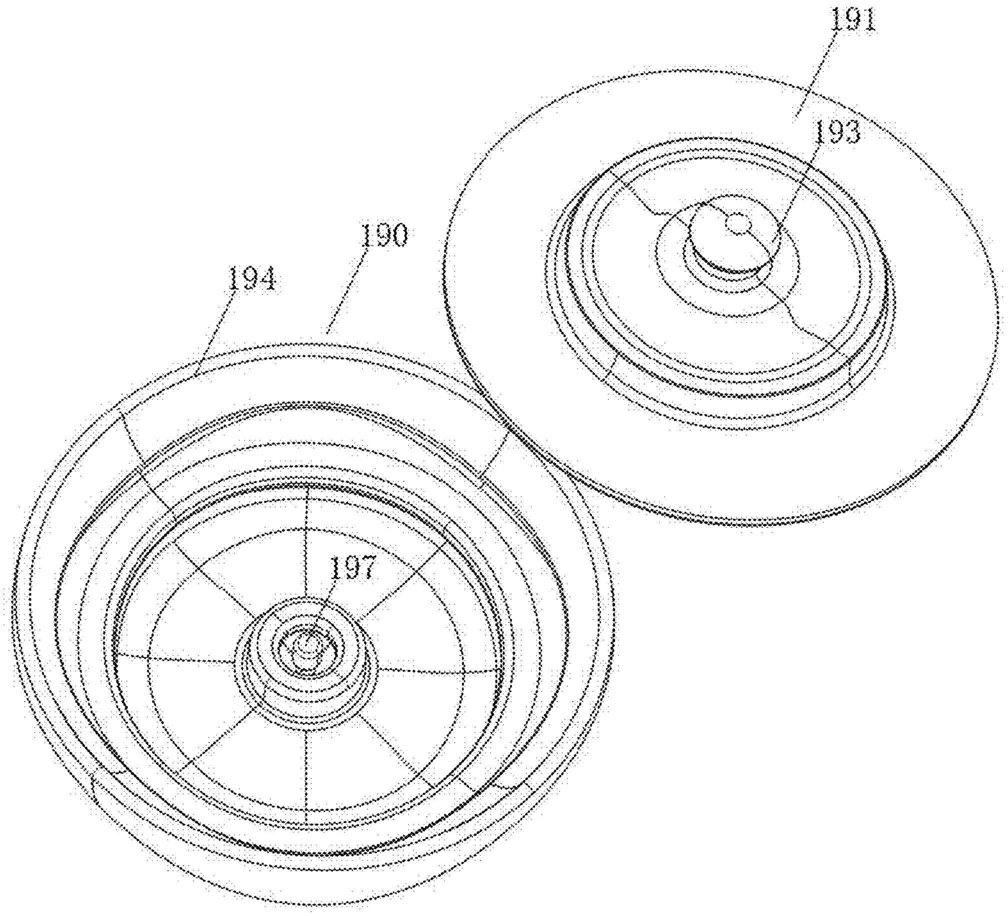
FIG. 8 shows a structural schematic diagram of a massage head in accordance with some embodiments of the present disclosure.

In some embodiments of the present disclosure, referring to FIG. 5, the connecting portion 130 is configured as a magnetic connecting portion 130, the magnetic connecting portion 130 includes a magnetic pin 133, and the magnetic pin 133 is inserted into an insertion hole 132 provided at the one end of the first strap 111 or the second strap 112. The corresponding compatible installation portion 130 is configured as a magnetic fixing lug 153 applicable to the magnetic connecting portion 130, the magnetic fixing lug 153 is provided with two groups, each group of the magnetic fixing lug 153 is fixedly provided on the outer side of the outer case 121, and an inner side of the magnetic fixing lug 153 is provided with a magnetic base 154 applicable to a size of ends of the magnetic pin 133.

Specifically, if the connecting portion 130 is configured as the magnetic connecting portion 130, its internal magnetic pin 133 is firmly inserted into the insertion hole 132 provided at one end of the first strap 111 or the second strap 112. When installing the massage components 120, if the installation portion 150 of the massage components 120 is configured as the magnetic fixing lug 153 adapted to the magnetic connecting portion 130, the end of the magnetic pin 133 will automatically and accurately adhere to the magnetic seat 154 disposed within the magnetic fixing lug 153 with strong magnetic force. This convenient connection method allows women to quickly assemble the massage components 120 and the wearable component 110 together without complex operations during private care, thereby meeting their needs for efficient massage care anytime, anywhere in different private care scenarios.

In some embodiments of the present disclosure, each of the massage components 120 includes an outer case 121, an outer side of the outer case 121 is provided with an installation portion 150 applicable to the connecting portion 130, and the outer case 121 is internally provided with a detachable massage mechanism 160 for providing different massage sensations.

Specifically, after the female users experience high-intensity exercise, there may be some discomfort or slight muscle tension in their private areas. The female users can first wear the wearable component 110 comfortably on their hands according to their own physical condition. Then, based on their current care needs, they can choose the massage component 120 with a targeted massage mechanism 160. If the connecting portion 130 is configured as the plug-in connecting portion 130, precisely connect the plug-in fixing lug 151 on the outer case 121 to the connecting portion 130. If the connecting portion 130 is configured as the magnetic connecting portion 130, quickly attach the magnetic fixing lug 153 to the connecting portion 130 to achieve personalized and efficient private area massage care.

In some embodiments of the present disclosure, the limiting mechanism 140 includes two strap passages 141 provided on a surface of the first strap 111, a limit fastener 142 is provided between the two strap passages 141 to fixedly connect to a bottom surface of the first strap 111, a surface of the second strap 112 is provided with a plurality of limit strap hole 143, and the limit fastener 142 is inserted into corresponding limit strap hole 143 for locking after one end of the second strap 112 passes through the two strap passages 141.

Specifically, when the users massage and care for their private parts, they can pass one end of the second strap 112 through the two strap passages 141, and adjust the length of the second strap 112 passing through the strap passage 141 according to their real-time body condition, and then precisely insert the limit fastener 142 into the corresponding limit strap hole 143. Through flexible adjustment, the wearable component 110 can fit tightly and comfortably on the hand or wrist.

In some embodiments of the present disclosure, the massage mechanism 160 includes a waterproof case 161, the waterproof case 161 is interlacedly connected to the outer case 121, the waterproof case 161 is internally provided with a vibration member 170 and a control member 180, a waterproof cover 162 is fixedly installed on a top of the waterproof case 161, and the top of the waterproof cover 162 is provided with multiple massage heads 190 for providing different massage sensations.

Specifically, when the users perform private area massages, the waterproof design of the massage mechanism 160 can ensure safe and stable use in humid environments. The users first accurately install the massage mechanism 160 within the outer case 121, and through the tight interweaving and assembly of the waterproof case 161 and the outer case 121, ensuring the structural stability. After activating the control member 180, the vibration member 170 begins to work efficiently, driving the massage heads 190 to generate vibrations of different frequencies and intensities, providing comprehensive and detailed massage care for private areas. Different types of the massage heads 190 can generate various massage sensations, meeting the personalized needs of different female users in different private care scenarios.

In some embodiments of the present disclosure, an outer side of the waterproof case 161 is fixedly connected with multiple bar-type protrusions 163, when the waterproof case 161 is interlacedly assembled with the outer case 121, the bar-type protrusions 163 are tightly in contact with an inner wall of the outer case 121, the waterproof case 161 and the outer case 121 each is provided with a button hole 164 at one side thereon, a bottom of the waterproof case 161 is provided with a magnetic charging base 165.

Specifically, when using the adult massage device, the users can easily operate the control member 180 through the button hole 164 to activate the adult massage device. The bar-type protrusions 163 can ensure that the waterproof case 161 remains stable within the outer case 121 without shaking, ensuring that the massage mechanism 160 works continuously and stably, thereby ensuring that the adult massage device can provide reliable protection for women's private area massage care.

Moreover, the interlacedly connection of the waterproof case 161 and the outer case 121 allows for flexible assembly and disassembly them, making it easier for the users to maintain or replace the waterproof case 161 and its internal components.

In some embodiments of the present disclosure, the vibration member 170 includes a driving motor 171 placed within the waterproof case 161, the driving motor 171 is fixedly installed with a motor limit seat 166 provided within the waterproof case 161 and the waterproof cover 162, and an output end of the driving motor 171 is connected to a connecting arm 172 enables its reciprocating swing.

Specifically, after activating the adult massage device, the control member 180 can accurately control the operation of the driving motor 171. Under the strict limit of the motor limit seat 166, the driving motor 171 can be operated stably and efficiently and drive the connecting arm 172 to oscillate back and forth in a regular manner. Then, the oscillation of the connecting arm 172 is transmitted to the massage heads 190, causing them to generate stable and efficient vibrations. In this way, women's private areas are deeply massaged, which can effectively alleviate discomfort, promote blood circulation, and also enhances the health status of the private areas.

In some embodiments of the present disclosure, the control member 180 includes a PCB control board 181 placed within the waterproof case 161, a surface of the PCB control board 181 is integrated with a multifunctional control button 182, and one end of the multifunctional control button 182 is placed within the button hole 164, and the PCB control board 181 is fixedly installed with a circuit board limit seat 167 disposed within the waterproof case 161 and the waterproof cover 162.

Specifically, when using the adult massage device, the users can easily operate the multifunctional control button 182 through the button hole 164, the multifunctional control button 182 accurately converts the operation intention into an electrical signal and transmits it to the PCB control board 181. After received the signal, the PCB control board 181 can control key parameters such as rotate speed of the driving motor 171 of the vibration member 170, so as to flexibly and efficiently adjust the vibration intensity and frequency of the massage heads 190, fully meeting the diverse massage needs of women in different private care scenarios. The circuit board limit seat 167 can ensure that the PCB control board 181 is stably installed within the waterproof case 161, without affecting the normal and efficient work of the control member 180.

In some embodiments of the present disclosure, each of the massage heads 190 includes a vibrating plate 191, a socket 192 adapted to a size of one end of the connecting arm 172 is provided at a bottom of the vibrating plate 191, the socket 192 is sleeved with the one end of the connecting arm 172, a top of the vibrating plate 191 is fixedly connected with a spherical seat 193 for the strap passages, and a top of the spherical seat 193 for the strap passages is detachably provided with a silicone massage body 194.

Specifically, when the adult massage device is working, the driving motor 171 drives the connecting arm 172 to perform reciprocating oscillation, and then the connecting arm 172 drives the vibrating plate 191 to generate efficient vibration. The vibrating plate 191 then accurately transmits the vibration to the spherical seat 193 of strap passages and the silicone massage body 194. The users can flexibly choose different types of the silicone massage body 194 to install on the spherical seat 193 of strap passages according to their own private area real-time conditions and personal needs.

When the skin in the private areas is sensitive, a soft and smooth textured silicone massage body 194 may be chosen. When it is necessary to focus on promoting blood circulation, the silicone massage body 194 with specific massage protrusions 195 may be selected to achieve personalized and precise private area massage care effects.

Figure 4:
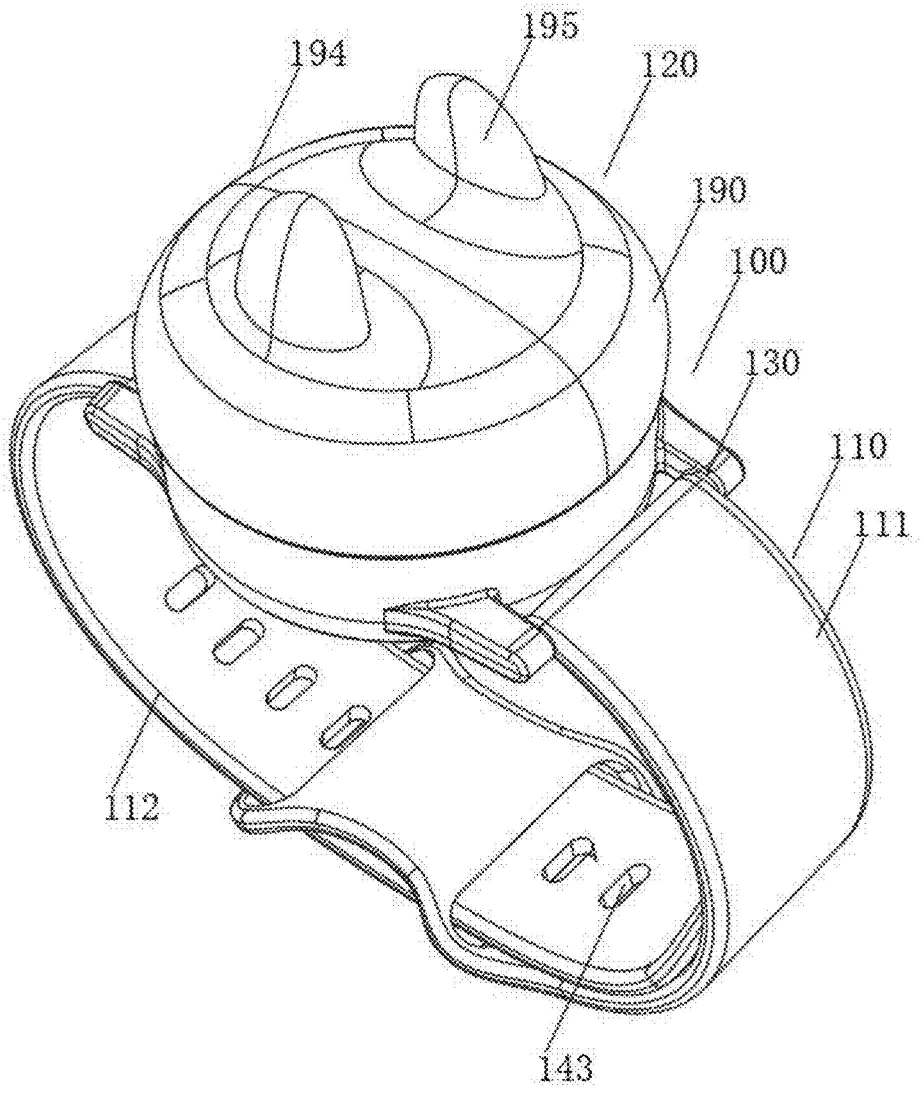
FIG. 4 shows still another structural schematic diagram of the wearable adult massage device in accordance with some embodiments of the present disclosure.

In some embodiments of the present disclosure, the silicone massage body 194 is configured with at least two types, a top of the silicone massage body 194 is provided with massage protrusions 195 or a massage groove 196 (as shown in FIG. 4 and FIG. 1 respectively), a bottom of the silicone massage body 194 is fixedly connected with a plug pin 197, and the plug pin 197 is inserted into a hole in the spherical seat 193 of the strap passages.

Specifically, when selecting the silicone massage body 194 with massage groove 196, the plug pin 197 disposed at the bottom of the silicone massage body 194 is precisely inserted into the hole of the spherical seat 193 of the strap passages. After activating the adult massage device, the vibration of the massage heads 190 is accurately transmitted to the private areas through the silicone massage body 194. The massage groove 196 can better fit the skin texture of the private areas, providing more detailed and precise massage to specific areas, effectively relieving discomfort symptoms such as itching. When the users want to perform a more comprehensive relaxation massage, they can replace it as the silicone massage body 194 with the massage protrusions 195 to meet the diverse massage needs of different private care scenarios.

In some other embodiments of the present disclosure, a massage method by using any one of the wearable adult massage device described above is provided, which includes the following steps.

S1, wearing the wearable adult massage device through the wearable component 110.

S2, selecting different massage components 120 and the wearable component 110 to be assembled together respectively to achieve massage in different scenarios.

When using the adult massage device specifically, when the female users need to massage, they can first choose a suitable wearable component 110, gently wrap the first strap 111 and the second strap 112 around their wrist or hand, and use the limiting mechanism 140 to accurately fix the wearable component 110 according to their own comfort and body condition. Then, based on the real-time status of their private areas, such as whether they are in a physiological period, whether they have inflammation or discomfort symptoms, and their personal preferences for massage intensity and frequency, the users select different massage components 120 and the wearable component 110 for clever assembly, and then select specific massage heads 190 and the massage components 120 of the massage mechanism 160. The installation portion 150 of the massage components 120 is accurately adapted to the connecting portion 130 of the wearable component 110, for example, using a plug-in or magnetic connection, and then the adult massage device is activated to enjoy exclusive and personalized private areas massage care services, effectively relieving discomfort in the private areas and promoting physical health and comfort.

The above are only some preferred embodiments of the present disclosure and are not intended to limit the present disclosure. For one of ordinary skill in the art, various modifications and variations thereto may be made. However, any modifications, equivalent substitutions, improvements, etc. made within the concept and principles of the present disclosure shall be included within the scope of protection of the present disclosure.

What is claimed is:

1. A wearable adult massage device, comprising an adult massage body applicable to wear on a user's limbs, and the adult massage body including a wearable component and a detachable massage component;

wherein the detachable massage component has a respective massage function, and the wearable component is configured to be assembled with the detachable massage component together to provide massage for the user;

wherein the wearable component comprises a first strap and a second strap, the first strap and the second strap are each provided with a connecting portion on one end thereon, and the first strap and the second strap are fixedly connected together at another end thereon by a limiting mechanism;

wherein the connecting portion is configured as a plug-in connecting portion, the plug-in connecting portion comprises a spring pin, the spring pin is inserted into an insertion hole provided at the one end of the first strap or the second strap, and both ends of the spring pin are placed outside the insertion hole;

wherein the detachable massage component comprises an outer case, an outer side of the outer case is provided with an installation portion applicable to the connecting portion, and the outer case is internally provided with a detachable massage mechanism;

wherein the installation portion is configured as a plug-in fixing lug applicable to the plug-in connecting portion, the plug-in fixing lug is provided with two groups, each group of the plug-in fixing lug is fixedly provided on the outer side of the outer case, and an inner side of the plug-in fixing lug is provided with a pin hole applicable to a size of ends of the spring pin;

wherein the limiting mechanism comprises two strap passages provided on a surface of the first strap, a limit fastener is provided between the two strap passages to fixedly connect to a bottom surface of the first strap, a surface of the second strap is provided with a plurality of limit strap holes, and the limit fastener is inserted into a corresponding one of the plurality of limit strap holes for locking after one end of the second strap passes through the two strap passages;

wherein the detachable massage mechanism comprises a waterproof case, the waterproof case is interlacedly connected to the outer case, the waterproof case is internally provided with a vibration member and a control member, a waterproof cover is fixedly installed on a top of the waterproof case, and the top of the waterproof cover is provided with a detachable massage head;

wherein an outer side of the waterproof case is fixedly connected with multiple bar-type protrusions, in case the waterproof case is interlacedly assembled with the outer case, the bar-type protrusions are tightly in contact with an inner wall of the outer case, the waterproof case and the outer case are each provided with a button hole at one side thereon, a bottom of the waterproof case is provided with a magnetic charging base, and the waterproof case is internally provided with a battery;

wherein the vibration member comprises a driving motor placed within the waterproof case, the driving motor is fixedly installed with a motor limit seat provided within the waterproof case and the waterproof cover, and an output end of the driving motor is connected to a connecting arm which enables its reciprocating swing; and wherein the control member comprises a PCB control board placed within the waterproof case, a surface of the PCB control board is integrated with a multifunctional control button, and one end of the multifunctional control button is placed within the button hole, and the PCB control board is fixedly installed with a circuit board limit seat disposed within the waterproof case and the waterproof cover.

2. The wearable adult massage device according to claim 1, wherein the massage head comprises a vibrating plate, a socket adapted to a size of one end of the connecting arm is provided at a bottom of the vibrating plate, the socket is sleeved with the one end of the connecting arm, a top of the vibrating plate is fixedly connected with a holed spherical seat, and a top of the holed spherical seat is detachably provided with a silicone massage body.

3. The wearable adult massage device according to claim 2, wherein a top of the silicone massage body is provided with massage protrusions or a massage groove, a bottom of the silicone massage body is fixedly connected with a plug pin, and the plug pin is inserted into a hole in the holed spherical seat.

4. A massage method by using the wearable adult massage device according to claim 1, comprising steps of:

S1, assembling the wearable component with the detachable massage component together; and S2, wearing the wearable adult massage device through the wearable component to provide the massage for the user.

* * * * *